(12) United States Patent
Hamel

(10) Patent No.: US 8,108,881 B2
(45) Date of Patent: ***Jan. 31, 2012

(54) SYSTEM AND METHOD FOR IMPLEMENTING CLICK-THROUGH FOR BROWSER EXECUTED SOFTWARE INCLUDING AD PROXY AND PROXY COOKIE CACHING

(75) Inventor: Lawrence Arthur Hamel, Menlo Park, CA (US)

(73) Assignee: Mqquis Techtrix LLC, Las Vegas, NV (US)

( * ) Notice: Subject to any disclaimer, the term of this patent is extended or adjusted under 35 U.S.C. 154(b) by 530 days.

This patent is subject to a terminal disclaimer.

(21) Appl. No.: 12/329,534

(22) Filed: Dec. 5, 2008

(65) Prior Publication Data

US 2009/0172091 A1   Jul. 2, 2009

Related U.S. Application Data

(63) Continuation of application No. 09/860,379, filed on May 18, 2001, now Pat. No. 7,475,404.

(60) Provisional application No. 60/205,617, filed on May 18, 2000, provisional application No. 60/205,621, filed on May 18, 2000, provisional application No. 60/205,640, filed on May 18, 2000.

(51) Int. Cl.
*G06F 13/00* (2006.01)

(52) U.S. Cl. ......... 719/317; 719/329; 709/202; 709/217
(58) Field of Classification Search .................. 719/317, 719/329; 709/202, 217
See application file for complete search history.

(56) References Cited

U.S. PATENT DOCUMENTS 6,138,162 A   10/2000   Pistriotto et al.
(Continued)

FOREIGN PATENT DOCUMENTS

WO   0068823 A2   11/2000
(Continued)

OTHER PUBLICATIONS

Downey, "Getting out of the Sandbox: Building an Applet Proxy Server", WebMediaBrands Inc., 1997.

*Primary Examiner* — Andy Ho
(74) *Attorney, Agent, or Firm* — Brundidge & Stanger, P.C.

(57) ABSTRACT

An improved proxy is disclosed for allowing click-through on an ad URL delivered on a web page within a Java® applet executing on a client machine. The proxy caches cookie information for the browser, to support java applications that do not allow for planting of cookies directly. When the user clicks on the ad URL, the proxy retrieves the relevant cookie and link information from a host side database, and uses the same to help the browser open the correct URL associated with the ad. The proxy acts to extend the reach and access of a conventional applet beyond the resources of a download host associated with such applet.

47 Claims, 8 Drawing Sheets

U.S. PATENT DOCUMENTS

| | | | |
|---|---|---|---|
| 6,263,365 B1 | 7/2001 | Scherpbier | |
| 6,314,451 B1 * | 11/2001 | Landsman et al. | 709/203 |
| 6,317,761 B1 * | 11/2001 | Landsman et al. | 715/205 |
| 6,490,624 B1 | 12/2002 | Sampson et al. | |
| 6,535,911 B1 | 3/2003 | Miller et al. | |
| 6,628,767 B1 | 9/2003 | Wellner et al. | |
| 6,687,737 B2 | 2/2004 | Landsman et al. | |
| 6,769,123 B1 | 7/2004 | Chan | |
| 6,785,705 B1 | 8/2004 | Kocherlakota | |
| 6,880,123 B1 * | 4/2005 | Landsman et al. | 715/205 |
| 6,954,783 B1 | 10/2005 | Bodwell et al. | |
| 6,961,712 B1 * | 11/2005 | Perkowski | 705/26.62 |
| 6,990,630 B2 * | 1/2006 | Landsman et al. | 715/205 |
| 7,016,960 B2 | 3/2006 | Howard et al. | |
| 2002/0007393 A1 | 1/2002 | Hamel | |
| 2006/0089880 A1 * | 4/2006 | Merriman et al. | 705/14 |

FOREIGN PATENT DOCUMENTS

WO     0146873 A1     6/2001

* cited by examiner

SYSTEM AND METHOD FOR IMPLEMENTING CLICK-THROUGH FOR BROWSER EXECUTED SOFTWARE INCLUDING AD PROXY AND PROXY COOKIE CACHING

CROSS REFERENCE TO RELATED APPLICATIONS

This application is a continuation application of Ser. No. 09/860,379, now U.S. Pat. No. 7,475,404 entitled System and Method for Implementing Click-through for Browser Executed Software Including Ad Proxy and Proxy Cookie Caching, filed on May 18, 2001, which claims the benefit of the following applications: U.S. Provisional Patent Application Ser. No. 60/205,617 filed May 18, 2000 titled "System and Method for Implementing Click-through for Browser Executed Software Using Proxy Cookie Caching"; and U.S. Provisional Patent Application Ser. No. 60/205,621 filed May 18, 2000 titled "System and Method for Implementing Internet Software Proxy for Managing Advertising Content"; and U.S. Provisional Patent Application Ser. No. 60/205,640 filed May 18, 2000 titled "System and Method for Implementing Click-through for Browser Executed Software." The above-identified applications together with their appendices are expressly incorporated by reference herein.

APPENDIX

An appendix of computer listings co-filed with this application is expressly incorporated by reference as if fully rewritten herein.

FIELD OF THE INVENTION

The present invention relates to systems and methods that facilitate client software interactions with a remote server through use of cookie files. The invention has particular applicability to internet applications where it is desired to allow a user to perform a click-through on a URL tag located within a client Java® based software routine using a proxy.

BACKGROUND

The use of the world wide web (WWW) is increasing rapidly, and so of course is the demand for intelligent systems and software which can permit users to better and more easily explore the offerings of the same. To access information on the WWW, a user typically utilizes a browser program having a graphical interface (such as those offered by such companies as Sun, Microsoft, and Netscape to name a few) to establish an electronic connection between his/her local client computing system, and a remote server system located at an ISP (Internet Service Provider). After such connection is made, the user can then perform a number of operations through the browser, including such tasks as uploading/downloading files (including text, graphics, audio, video, etc.) and even executing programs located on such remote server. The ability to execute programs retrieved from a remote ISP is in fact one of the greater attractions and promises of the WWW. By having a repository which is accessible to millions of users simultaneously, program authors have an opportunity to expand the distribution and use of their products at a level far beyond that previously attainable.

Recently, a type of programming method that has become popular commercially is the use of so-called Java® applets for running programs within conventional web browsers. Java® applets are akin to Java® applications, but the former are specifically designed to interoperate with graphical user interfaces such as the conventional browsers mentioned above. Applets are extremely popular programming methods today also due to the fact that they provide program authors with the tools to create multi-media programs quickly, easily, and with far more capability than conventional HTML based applications. In fact, Java® applets offer a superior interactive experience to the user, allowing users to work fluidly and dynamically with information, and without forcing them to wait continually for web pages to load and re-load.

Despite their many advantages, however, applets have some limitations which so far have prohibited their use on an even greater scale. For instance, for various security reasons, the authors of Java® intentionally constrained applets to operate in what is conventionally known as a "sand box." In other words, applets were imbued with substantial functionality, but they are not permitted, for example, to do such things as read or write from file systems outside their own domain. So, in the case of a remotely downloaded applet embodying some code which the user desires to execute, such applet cannot read or write from computing systems other than the host from which it originated. This significantly restricts the ability of an applet to perform functions that can be performed by more primitive programming techniques, such as HTML. For a general discussion of the basic limitation of applets, please see "An Introduction to Computer Science—Using Java" by Kamin et. al., McGraw-Hill (1998).

To get around these restrictions, various prior art techniques have been proposed for permitting applets to access resources outside of their download host, through the use of so-called "proxies." This approach allows applets to behave more like any other conventional HTML based code, so that the user is given additional functionality in an invisible and seamless fashion. An example of such proxies can be found at the following locations on the internet: (1) wwwdotwebreferencedotcom/dev/proxy; which contains an article by Kyle Downey entitled "Getting out of the Sandbox: Building an Applet Proxy Server" and (2) wwwdotgamelandotcom/experts/java/answers88dothtml by Leihai Xu. The first reference contains a reasonably detailed explanation of how a "Quotron" applet could be implemented so that even if it was downloaded from a particular host server (e.g., domain A) it could still access quote information from a computing system operated by Yahoo! in a manner transparent to the user. A proxy connection is set up in the host server by the applet, which retrieves the quote information on behalf of the applet, thus preventing the applet from violating its access restrictions.

Most destination sites rely on advertising sales (banners, buttons, and text ads) as their main revenue stream, and naturally one goal is to maximize the exposure of ads to the site's audience. The restriction on applets currently makes them undesirable for advertising for a number of reasons. First, they only communicate to their host and thus they do not work well with advertising content that is based at so-called "ad servers" such as those run by such companies as Doubleclick, AdForce, etc., either locally or at a third party server. This is because the advertising content is located at such ad servers, not at the host from which the applet was downloaded. As a general trend, most destination site operators are moving to local and remote third party ad servers, because they are more easy to use, and allow more ad capability. This means that operators of host server systems are caught in a dilemma between providing the most interesting and dynamic computing experience for their users (which are applet based applications), and the need to generate advertising revenue from sponsors (which can only be done with ad servers that are incompatible with applet based applications).

Applets do have some ad content handling capability, but it is limited. To some extent, even certain types of conventional graphical content can cause trouble when used within an applet. Applets are called into conventional web pages, and be floated on top of them as well. The applet can invoke page changes, but there is no way for an applet to refresh an ad without reloading the applet again. To refresh the applet means that a reload and restart of the applet must be done, causing significant delay and frustration to the user. Furthermore, fairness to the advertisers must be considered, as advertisers want to be assured that the audience is actually engaged in viewing the web site and the advertiser's ad. Standard practice is that ads are reviewed with each page view, triggered by the user clicking a link or loading a new page. Unfortunately, some sites have resorted to automatically refreshing an applet (and even HTML based) banner ads at fixed time intervals (on the order of 15 seconds to 1 minute). This approach is unfair to advertisers, because leaving a page open will generate ad impressions, even if no one is using the computer. Thus, the present limitations on applets are being addressed in a fashion that cheats advertisers out of their ad dollars, because impressions are not accurately tallied.

As a result of this technical limitation, applets do not enjoy the kind of advertising exposure capability as conventional HTML coded applications. In other words, every new invoked HTML based page can change and display a new banner ad dynamically. These ad exposures by the user can be measured and used to determine some appropriate compensation from the ad sponsor to the host system operator. In contrast, in a page executing a conventional applet based application, the ad does not change, regardless of how long the applet is running, or how many times it is run. An example of a prior art applet for ads is available at: wwwdotjavasoftdotcom/openstudio/applets/bannerdothtml, under the name "Javabanner." Notably, however, this applet does not use a proxy, and does not know how to handle cookies from an ad server. It simply includes the ads as part of the hard wired parameters for the applet; accordingly, it is not dynamically loaded with ads over time, which is a significant limitation.

Clearly, therefore, there exists a current and pressing need to imbue applets with the capability to display ads in a more flexible and convenient manner that does not require significant delays.

Another related problem associated with advertising with Java applets relates to the fact user "clickthrough" is also not well handled. Click-through describes an action such as when a user clicks on an ad banner and is hyperlinked to a URL associated with the ad. Most ad servers require a click-through URL to "redirect" through the ad server. In other words, the user typically is sent to the ad server with the first request and then is (invisibly to the user) redirected to the payee site. In transit, this click to the ad is counted in the ad server. A recent growing trend seen in the industry is the requirement by ad servers that they download a "cookie" along with the ad, so that after the banner is downloaded, a subsequent click-through is identified via the cookie. In other words, the user first establishes an identity by downloading the ad banner and its cookie, and that identity (the cookie) is used when the user clicks on the ad, causing a call back to the server for the redirection (and supplying the cookie back to the server). Accurate counting of click-throughs is critical in contemporary internet advertising programs, because many common benchmark tools for evaluating advertising effectiveness, prevalence, etc., are based on such events, and their origin.

Cookies (and of course clickthroughs based on cookies) are especially difficult to handle when using java applets. This is because, even though the applet is embedded in the browser, it does do not have free access to all cookies because of standard industry cookie security restrictions. These restrictions, implemented by most commercial browsers, restrict a particular destination site to read only cookie(s) already created by that site. In other words, one site cannot read another site's cookies.

Thus, in the context of ads downloaded through applets from third party ad servers, a cookie received via a proxy cannot be "planted" in the browser because the applet itself does not come from the (proxied) web site. Accordingly, many otherwise useful java applet applications are not implemented on a widespread scale due to this limitation.

Therefore, there is another extremely urgent need in the industry for a way to permit applets to properly handle click-through by users on java based advertising banners.

SUMMARY OF THE INVENTION

An object of the present invention, therefore, is to overcome the aforementioned limitations on the use of conventional internet based advertising mechanisms within Java® applets;

A related object is to implement a system and method for implementing an improved applet that is adapted so that users of the WWW can enjoy the benefit of the capabilities of such applications while still being able to experience and interact with advertising content from a wide variety of advertising sources, and in any variety of forms;

A further related object is to implement a system and method for implementing an improved Java® applet proxy that is customized and configured for handling ad content from a variety of ad servers, so that applet based applications and web pages can be provided with significantly expanded advertising capabilities;

Yet another object is to provide such proxy with intelligent and flexible filtering so that a Java® based applet executing on a client machine can quickly and transparently execute and view ad content that is tailored to be appropriate for such applet; and Still another object of the present invention is to allow for ad content to be cached at a local server, so that access to appropriate ad material by an applet can be made quickly and without interruption in the event of a disruption in service at a third party ad server;

Another object of the present invention is to provide a proxy that is able to emulate the capabilities of a conventional browser and support Java applets by caching cookie files as might be needed to present advertising material and coordinate click-throughs in connection with such applets;

Yet a further object of the present invention is to provide a proxy that is able also to cache client IP addresses as well, so that such information can be passed on to an ad server to glean demographic information;

An additional object of the present invention is to allow internet destination sites to be able to offer the highest quality and most interactive client applications in Java® applet form, while still being able to utilize the services of local and third party ad services in a flexible and revenue optimized fashion;

A further object of the present invention is to provide a method and system that can be used by local and third party ad service providers for enhancing the reach of their advertising content to client systems connected to the WWW.

Still a further object of the present invention is to provide a method and system that can be allows click-throughs by users in connection with Java applet ads to be properly and transparently handled and measured for the benefit of such users, advertisers, and ad services.

A related object of the present invention is to provide a method and system that allows an applet and a proxy to coordinate and control browser functions to enable the applet to mimic functionality normally only associated with a full browser, so that content can be delivered and accessed by users under control of the applet/proxy;

A first aspect of the present invention, therefore, which effectuates a number of these objects includes a system and associated method for enabling a java based software applet associated with a destination site to display content (within a browser connected to the internet) from a third party site separate from the destination site. The system includes a proxy software routine executing at the destination site, which includes software code for performing the following operations: to monitor requests from the java based software applet for the content; to make requests for the content from the third party site, where such requests are directed to content that is otherwise not accessible directly by the java based software applet (i.e., outside the java sandbox); and to evaluate content display parameters associated with the content to determine if they are compatible with applet display parameters associated with the java based software applet. In this fashion, the proxy operates to extend access capabilities of the java based software applet to content that is outside of the destination site, such as third party Ad Server sites.

In a preferred embodiment of this aspect of the invention, the content consists of an industry standard advertising banner commonly employed for displaying advertising material on the Internet. While the proxy can be implemented in simple form to simply filter incompatible ads (and then ask for a new one instead from an ad Server), it can also be adapted to adjust some ads if necessary to make them fit within a particular applet display environment Furthermore, user click-throughs on ads within the applet (regardless of whether they originate from a third party ad server) can also be measured if desired. Finally, the proxy can be set to "cache" ads as well in some environments, to accommodate downtime disruptions in the Ad servers. The entire operation is transparent to the user, who experiences the display of the advertising content as if it originated from the download host associated with the applet running in the browser.

A related aspect of the present invention relates to a system, therefore, where a proxy at a server site, and an applet executing within a browser at a client site, cooperate and coordinate together to facilitate content delivery within an applet in a manner that is optimized for the particular client/server pairing. Specifically, the content delivery task can be broken up into separate functions, and the execution of these functions can be distributed across the network so that responsibility is allocated between the client and server system, minimizing the burden on the applet computing resources needed. In one instance, a proxy can control refreshing of an applet, stop delivery of ads through the applet, cache cookies, cache client IP addresses, or perform other administrative tasks to reduce the loading on a client system. Thus, the proxy can act as a common control mechanism where possible to assist in many common applet required tasks.

Other of the objects of the present invention are achieved by a first embodiment of a system for enabling a browser to execute a click-through operation to a third party site requiring a cookie and a URL. This first embodiment of the system enables an Internet capable browser viewing a destination site page to execute a click-through operation to a third party page located as a tag on the destination site page, where the tag is associated with a URL for a third party site of the type which requires a first cookie file associated with (originating from) the third party site. The system comprises an improved java based software applet originating from the destination site and executing within the browser in a first frame. The java based software applet is configured:

1) to display the tag for the third party page in the first frame as a first visible tag viewable by a user;

2) to control a second frame within the browser, such second frame being separate from the first frame, and having a second non-visible tag for the third party page not viewable by the user.

The second non-visible tag is usable by the browser for obtaining the URL and a second cookie file related to the first cookie file, so that in response to a click-through operation associated with the first visible tag, the browser can pass the URL and second cookie file to the third party site. Since the second cookie file contains the information needed as a first cookie file by the third party server, this permits a click-through operation to occur from within a java applet to the third party site. In this first embodiment the second frame is downloaded as part of the original HTML, page containing the applet, and is made known to the applet directly within the applet code, or as part of the proxy.

In this first embodiment of this second aspect of the invention, the click-through is done in response to ad content presented in the applet, and an ad proxy of the type described above in the first aspect of the invention is used to allow delivery of such content from the third party ad server. While the second cookie file contains at least the first cookie file information needed by the browser to perform the click-through, it may be desirable in some environments to pass on other information to the browser. Thus, the applet can exploit and manipulate the browser indirectly to perform functions normally associated only with a full browser's capabilities.

In a second embodiment of the second aspect of the present invention, instead of using a second frame within the browser, the proxy at the server site caches cookies from the ad servers. This embodiment is preferable in environments where it is not possible to guarantee a selection of an ad from an ad server, because the ad server merely provides a random ad call, and not specific and sufficient information to allow the applet-planted cookie to be usable. During a click-through operation, therefore, the proxy (rather than a second planted cookie) supplies the necessary cookie(s) to retrieve the ad selected by the user within the browser. The proxy can also pass on the client IP address, as well, so that the ad server "sees" the correct client demographic information during the click-through, rather than only the IP address of the proxy. It can be seen that in this embodiment, the proxy operates to emulate the browser's capabilities to access and supply resources to and from remote sites.

The present invention thus overcomes the current inability of applets to trigger ad impressions, which, to date, is a significant economic shortcoming inherent in Java® applets. Further, the demand for an ad delivery solution will become even more pressing as Java® applets become more widely available, and as web content moves from static information to an increasingly application-oriented model.

The present invention should find significant usage in a number of online environments, such as for example, a Java®-based online discussion forum. In these applications it is especially important to maximize ad exposures generated by user action. Financial discussion sites such as Raging Bull and Silicon Investor—and Deja and Remarq, which serve discussions to horizontal markets—have proven that online discussion is a lucrative business, as users click to read each message. Currently, however, in such applications the user is encumbered by continual page redraws and poor information presentation, and a lack of flexibility in the user interface. Similarly, the present invention can be used, for example, to increase the number of ad impressions generated by Java® based stock charting applications, such as found at the applicant's own website at: wwwdotprophetfinancedotcom/prophettalk.

Thus the invention offers a server-side technology that successfully accomplishes the following critical functions within Java® applets:

Delivers any type of gif or jpeg ad residing on the applet's local server;

Delivers ads managed by local ad serving technology (such as those offered by Ad Juggler, Central Ad Pro, and RealMedia) and can switch between servers, which is useful, especially if one goes down.

Delivers ads managed via a third-party ad network with remote ad servers (such as those offered by AdForce, DoubleClick DART, Flycast, L-90, and BurstMedia)

Correctly redirects the user on click-through

Enables the ad network to register and report user click-throughs

Changes the ad based on user-driven actions within the applet

Can optionally be set to refresh the ad based on time

Has the ability to detect when the applet has been idle and automatically terminates ad delivery if user is not engaged Delivers client IP address information for those ad servers that can utilize such demographics details associated with a web user;

Through these functions, the invention addresses the needs of all stakeholders in the advertising business model:

The Publisher, who wishes to capitalize on advertising impressions and click-through the Advertiser, who demands an assurance of a audience being exposed to their messaging (similar to audited circulation in print publishing) and reporting of campaign results the Advertising Networks, who generate commissions on advertising sales, targeting, and management the User, who wants the best possible web experience—including speed, interactivity, and free online content Finally, the applicant believes that the present architecture can be easily extended and used to deliver ads into ActiveX and other non-HTML-based environments.

DETAILED DESCRIPTION

Attached hereto also is an appendix of the source code used in the various applet routines described above. These supporting materials are provided to comply with the requirements pertaining to specifications under §112 of the Patent Act. All rights to the form of the expressions in such materials, including copyrights, are expressly reserved to the assignee of the present invention.

Figure 1:
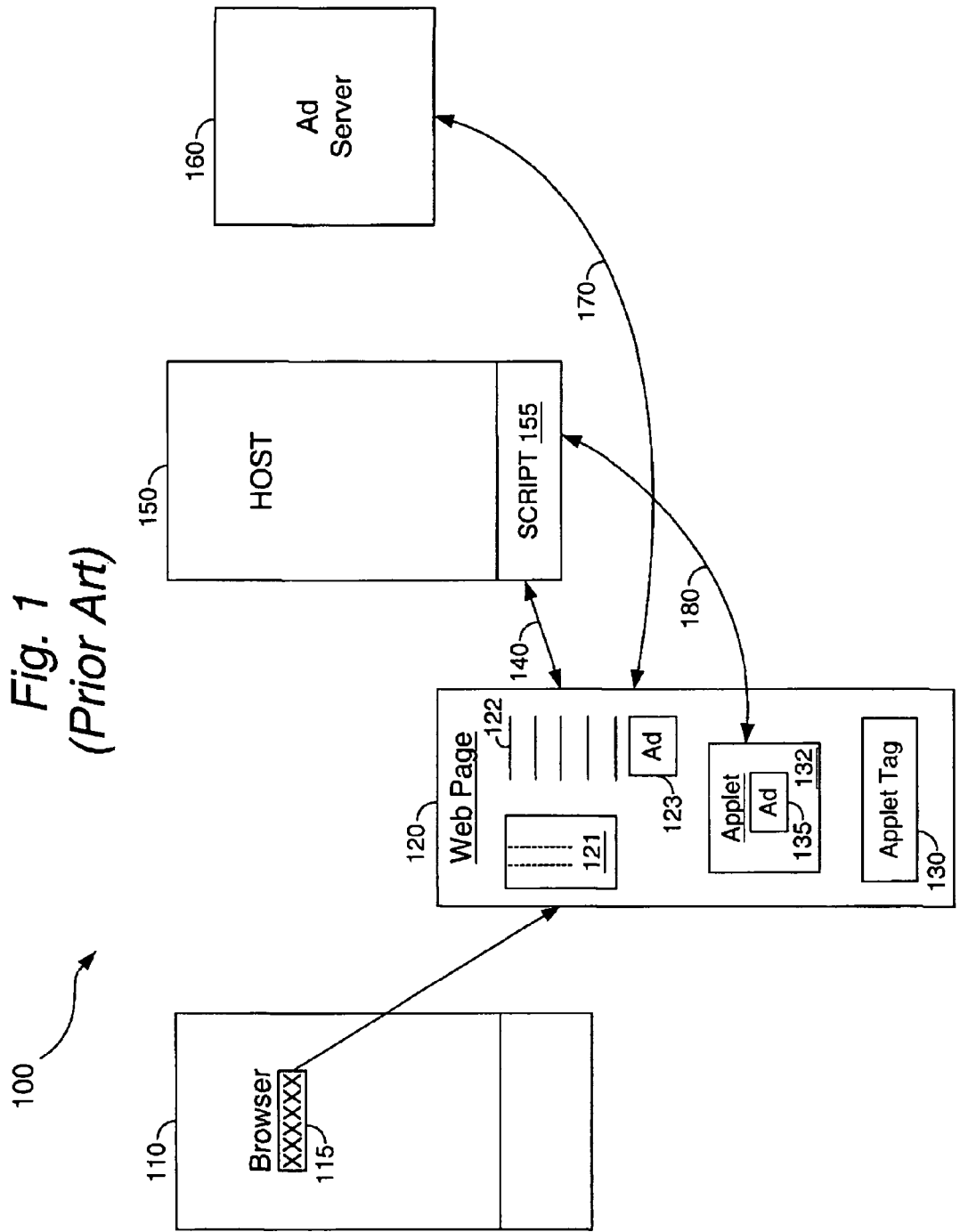
FIG. 1 is an illustration of a conventional prior art client-server system operating over a network such as the Internet, in which an applet running with a client browser can only access resources from an authorized download host.

A conventional prior art approach to the use of Java® applets within a web page is depicted in FIG. 1. To facilitate the present discussion, some general definitions for some of the terminology used below is now introduced:

Java® Applet: a small program downloaded and run in a browser.

Download Host: a server which holds an applet to be downloaded, and thereafter is the only communication source for the applet (as part of default security of the Java® applet model).

Ad Server: a source of advertisements, typically supplied by a separate company from a provider of the Java® applet.

Ad Banner: the image information which includes an expression of an advertisement by an advertiser Ad URL: a URL supplied by an ad supplier to associate for each ad banner, in case that banner is clicked (selected) by a user viewing the same Click-through: the action of a user clicking on an ad banner and being hyperlinked to the Ad URL.

Cookie: a small, optional file that may be provided by a web site, typically for user identification in subsequent web calls to the same server Cookie security: browsers are particularly security-conscious with cookies, and only allow a site to read cookie(s) already created by that site. In other words, one site cannot read another site's cookies.

It will be understood by those skilled in the art that this is not intended to be a comprehensive definitive characterization for these terms, but only a rough guideline or template to better understand the important concepts of the present invention. Within a client-server based system 100, a browser 110 linked to the WWW may permit a user to link via a URL 115 to a web page 120. The URL 115 may be specified by the user directly, may be provided as a result of a search engine, another web page, or any other conventional mechanism. Web page 120 is usually but one of many related web pages coded in HTML, Java, or other conventional browser readable languages and which are available at destination site (the Download Host mentioned above) 150. Within Web Page 120 are found a number of different objects that the user can interact with in browser 110, including graphical images 121 (i.e., JPEG, GIF, TIFF, etc. files) text data 122, advertising display 123 (usually an Ad Banner as referred to above) and applet tag 130. Web page 120 is presented to browser 110 in cooperation with a scripting program 155 (such as PERL) operating at host 150, again using any number of known and conventional techniques. Scripting program 155 is responsible for interpreting and handling user interactions within Web page 120, so that, for example, a user selection of a particular tag or URL within the page will cause the appropriate action or data to be communicated and processed across link 140 (the internet in this case) using a particular protocol (such as HTTP and/or TCP/IP for example).

For example, in the case where a user selects applet tag 130 within Web page 120, scripting program 155 would cause a Java® Applet 132 to be downloaded to the client system through a link 180 (also the internet in this case). From there it would be executed within browser 110 to allow the user to perform some function (i.e. such as a charting of a stock in graphical form or the like) visible in an applet frame 132 along with an advertisement 135 (again, typically an Ad Banner). While it would appear that there is no difference at this point between advertisement 135 running within applet 132, and advertisement 123 running within the webpage 120—in that both are visible to the user within the browser—there are some subtle and important differences.

First, the content of Ad 123 can be provided from any location on the internet, including from a third party Ad Server 160 across a link 170, since Ad 123 is located within a conventional HTML controlled portion of Web Page 120, and does not have any access restrictions. In contrast, Ad 135 operating within applet 132 can only access content located at host 150 across link 180 because of the security restrictions placed on unsecured Java® applets. Thus, the range of materials viewable to a user within an applet are significantly restricted. Correspondingly, an operator of host 150 is deprived of revenue producing opportunities from advertising located in other domains inaccessible to applet 132. Similarly, an operator of Ad Server 160 is unable to provide ad content services to those destination site entities that employ downloadable applets for their users.

Second, the user can, at any time, perform what is known as a "click-through" (by mouse activation for example) to select Ad 123 within the page, and thus be transported by a new link 170 to an appropriate web page located on ad server 160. This is done, for example, by browser 110 closing web page 120, and then opening a new page pointed to by an Ad URL associated with Ad 123 at Ad server 160. Again, in contrast, a click-through on Ad 135 will not re-direct the browser to an Ad Server 160, since it cannot provide a cookie such destination site. This limitation of the prior art is discussed again in more detail below in connection with the second aspect of the present invention which handles click-through activities.

Third, Advertisement 123 can change within the browser frame as the user changes or moves between different web pages 120, 120' (not shown) etc. This allows host 150 to present a variety of different advertising exposures to the user, and to increase the number of "impressions" made to the user audience. When applet 132 is running within its own frame, however, Ad 135 cannot be changed unless the entire applet is re-loaded and re-executed within browser 110. This latter operation can take quite a bit of time—depending on how fast the Java® virtual machine within the client system operates—and is thus undesirable from a user perspective. It is typically much slower than the time it takes, for example, for the browser to reload a new HTML based web page 120 with a new version of ad 123.

Because it is undesirable to do this, some destination sites operating a host 150 allow an applet 132 to be executed multiple times, or for long periods, without being refreshed with a new applet ad 135. This reduces the problem of making users wait, but is not optimal from an economic perspective because host 150 is only able to exploit a fraction of the percentage of available ad impressions that it would be providing with a non-Java® based frame.

Figure 2:
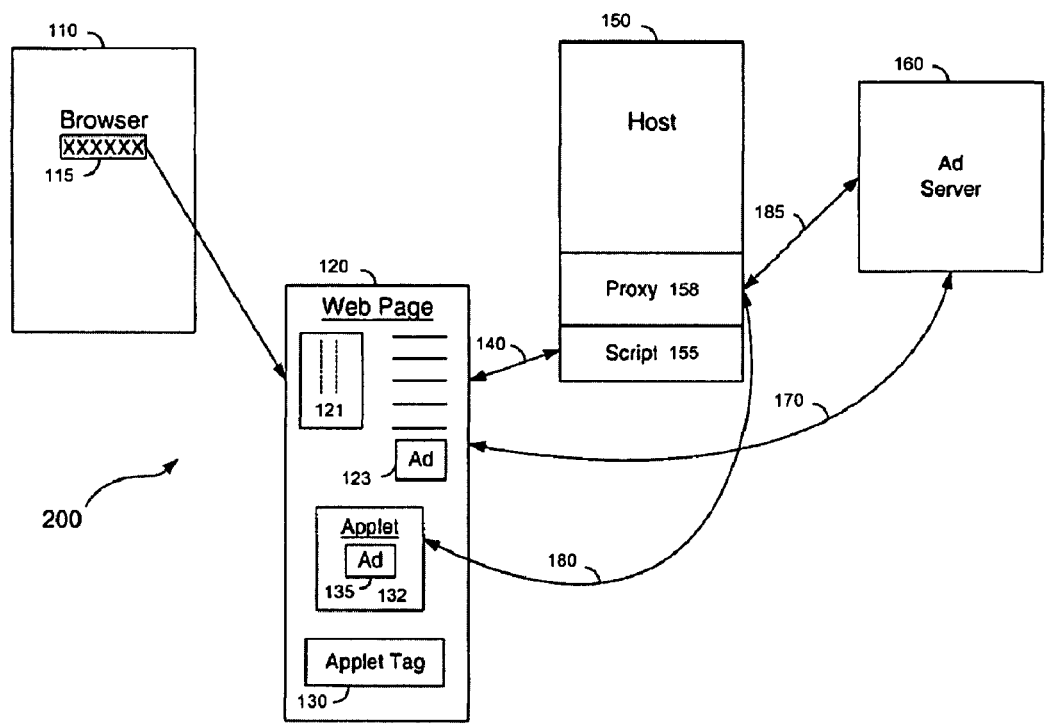
FIG. 2 is an illustration of a preferred embodiment of a first aspect of the present invention, in which, unlike the prior art system of FIG. 1, an applet running with a client browser can access content from any available location on the WWW.

A preferred embodiment of the first aspect of the Applicant's invention is shown in FIG. 2. Except where specifically noted, the components of system 200 identified by the same numerical identifiers as those in system 100 are the same. The primary difference introduced by the Applicant is the use of proxy 158 running on host 150, and an improved applet 132', which communicates with such proxy as explained below. Proxy 158 is a software routine configured to interact and coordinate between applet 132', host 150 and Ad Server 160. In this manner, an applet 132' running in the user's browser 110 can access ad content through a path consisting of link 180 to proxy 158, and link 185 between proxy 158 and Ad Server 160. This proxy 158 is unlike those in described the prior art in that, among other things: (1) it is specially configured to process ad content, which can be considerably more varied and complex than the simple numerical (quote) data used in such systems; (2) rather than being a passive entity with respect to such content, it can filter/tailor/request ad content in a proactive manner to be best suited for the applet in question.

Figure 3:
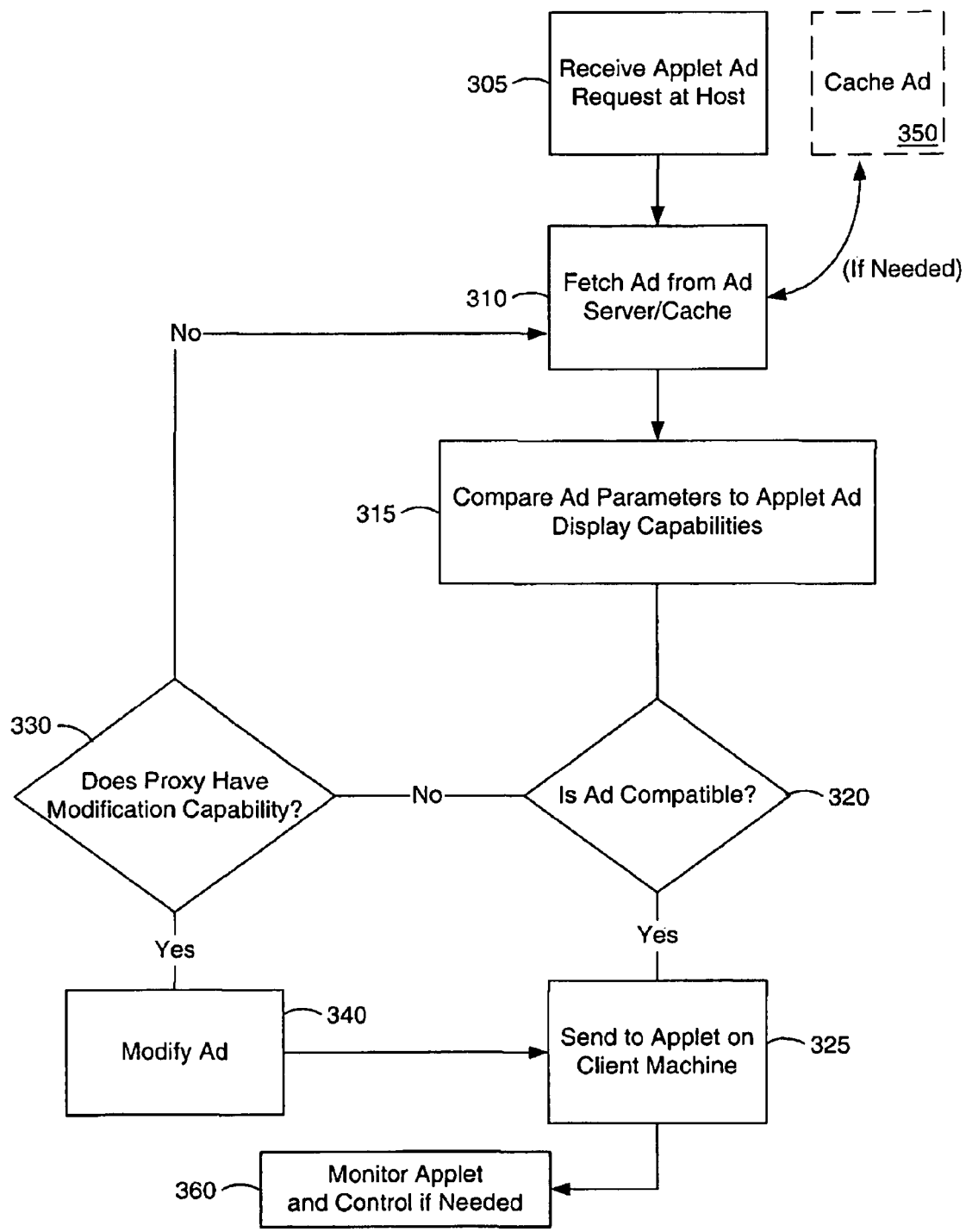
FIG. 3 is a flowchart depicting the material steps performed by a preferred method of the first aspect of the present invention to allow an applet to receive and process ad content from a wide variety of source materials.

The general operation of proxy 158 and applet 132' is provided in FIG. 3, and in detail for a particular embodiment in the attached appendix. In particular, as seen in FIG. 3, after an improved applet 132' has been downloaded and executed, at 305 a request is made by applet 132' to host 150 for an Ad 135. While it is not necessary until later, it is preferable that proxy 158 have some knowledge of the applet ad parameter limitations at this point. These ad parameters, which include, for example, such specifications as the type of image that can handled, the size of the image, the refresh frequency, and other well-known variables, can be stored in any conventional fashion at host 150 where they can be used for later evaluation.

At step 310 proxy 158 requests and retrieves an n ad from Ad Server 160. In this regard it should be noted that ads are typically served up or presented by Ad Server 160 in time on a continuous but random manner from an available pool of banner ads for a particular host. Nonetheless this feature is not critical to the present invention, and that all that is required is that Ad Server 160 have some capability for presenting host 150 with a varying selection of ad content as needed by an improved applet 132'. During step 315 proxy 158 examines the parameters of the ad proposed by the Ad Server 160 to determine if they are compatible with the capabilities of applet 132'. If the ad is otherwise compatible with the applet's capabilities, it is passed on through at step 320, where it is then sent by proxy 158 during step 325 to the applet 132'.

An ad might not be compatible with an applet 132' for a variety of reasons; for instance, it may require a refresh rate that is too high to be supported by the applet. In some cases, a new ad might be different in size than a prior ad, so that there might be some edging artifact from the old ad left over after the new ad is painted in the screen. Some types of ads are based on so-called "rich media," and these, too, are supportable within a browser 110, but not within an applet 132. These are but examples, and others will be apparent to those skilled in the art. In any event, should the ad not be compatible, an additional step 330 can be performed to determine if proxy 158 has any kind of modification capability—i.e., some additional intelligence for adjusting the ad in some fashion to make it compatible with the applet 132'. If not, then control is returned to step 310, where a request is made to Ad Server 160 for another ad. Again, since it is typically the case that there is a large pool of ads, and that they are served up randomly, it usually does not take long before a suitable ad for the applet is found.

In the event the ad can be modified a modification step 340 adjusts the ad and then passes it on to applet 132'. As an example, it is conceivable that the visible display space that is to be used by a new ad might be smaller than that of a previous ad; in such case, it would be visually disruptive to permit the edge artifacts of the old ad to remain. To correct this, the new ad might be provided with a white border sufficiently large to frame the new ad and obscure the old border, and then be passed on to applet 132' at step 325. This type of operation by proxy 158 saves on the administrative overhead required by applet 132 and helps to distribute the task of ad delivery—from a computational perspective—across the client/server link in a more optimal fashion. In other cases, some types of animated ads could have the "animated" features disabled by proxy 158 (if necessary or desirable) to make them supportable within an applet 132'. Other types of quick and simple modifications to ad content to make them compatible with applet capabilities will be apparent to those skilled in the art from the present teachings.

Java® applet 132' of the present invention is identical in all material respects with a prior art Java® applet 132, except that it is appropriately modified to interact and coordinate with proxy 158. In this regard, it sets up the proxy as the source of all ad content, and it can analyzed so that display parameters/limitations associated with the applet can be passed on so that the proxy 158 can suitably filter and/or adjust ad content. Furthermore, it can request and receive new ad content, either automatically (as a result of a timer expiring within the applet or the proxy) or in response to user action (clickthrough) or inaction (a timeout period).

Another aspect of the present invention performed by ad proxy 158 is the caching of ad content from Ad Server 160, which can be executed as a background task 350. In other words, even without prompting from an applet 132' an ad proxy 158 can be soliciting and locally storing ad content from the Ad Server 160, so that in the event of a disruption in service in Ad Server 160, or a problem in data link 185, Java® applets 132' (and even other HTML based ads 123) can be serviced by a set of cached ads at host 150. The size of the cache can be tailored, of course, on a system by system basis, but it is relatively easy and inexpensive to store even 100 different GIF banner impressions so that they are quickly available for viewing by users if desired. In such instance, of course, because Ad Server 160 is not involved in the ad presentation process (and thus cannot track the ads as presented) proxy 158 must also be configured with some kind of accounting facility (which can be done in any number of ways known in the art) to ensure that accurate tracking is made of the impressions transmitted to users. A simple clickthrough counting mechanism, well-known in the art, can be used for such purpose, so that proxy 158 essentially acts as an extension of the Ad Server 160 in situations where this is needed.

Another aspect of the present invention is illustrated generally in step 350, and that is the monitoring/control functionality that can also be provided by proxy 158. For example, the applet may have its own particular refresh capability (to support an ad that needs to be refreshed), but proxy 158 can be configured with specified parameters to trigger a refresh of selected portions of the ad at selected times instead. Thus, the proxy can cooperate in the handling and display of the ad content, and to present it in a way that may be better controlled.

In this way, the functionality of the applet can also be extended considerably, from an ad content delivery perspective, by some simple routines executed at the destination site system instead. Again, this type of "distributed" and cooperative computing across the network helps to better optimize content delivery and the user's overall experience, since task management can be allocated as needed to those computing entities best able at any moment in time to perform a particular processing function.

Similarly, proxy 158 can detect if the applet has been idle for some predetermined period (which can be adjusted based on the nature of the function served by the particular applet) and can terminate additional ad delivery if the user does not appear engaged. In this way, the advertiser is also better protected, because the ads are not being displayed indiscriminately or wastefully—such as a screen with no user sitting in front of it. The destination site would normally take credit for such ad deliveries, even if it is likely that there is no one to see the ads. Thus, the "impression" count achieved by the destination site will be more accurate, since it is more likely that an ad will actually receive exposure if there is some user activity occurring at the client system.

Finally, proxy 158 can also be set up so that it can detect when an ad server 160 is unavailable (either because of excess traffic, or if it has gone down) and thus re-direct the retrieval of ad content from another site. A list of additional fall back sites can be maintained, for example, and prioritized in any manner desired depending on the user's needs. In this way, too, delivery of ad content can be controlled, maintained and safeguarded against service disruptions.

Figure 4:
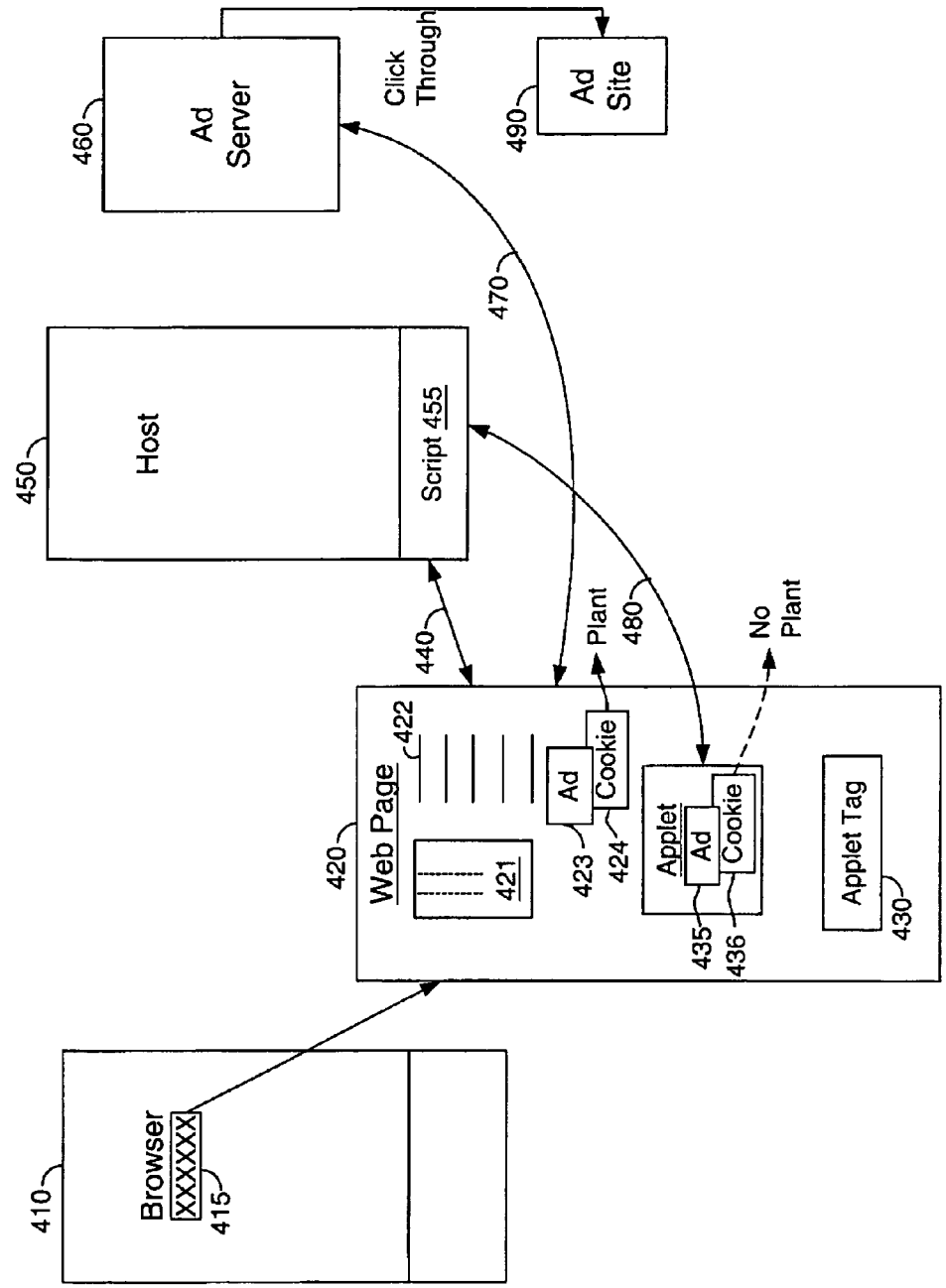
FIG. 4 is an illustration of a conventional prior art client-server system operating over a network such as the Internet, in which an applet running with a client browser does not handle click-throughs on a URL, because the applet does not have access to cookies originating from an Ad Server hosting the ad banner URL.

A second aspect of the present inventions is now introduced with regard to FIG. 4, illustrating a client-server based system 100 of the type described earlier for FIG. 1. Again, for the discussion below, like numerals are intended to correspond to the same structures and features discussed above for FIG. 1.

In this depiction of the prior art, however, it can be seen that a typical Ad 123 from a third party Ad Server 160 has an associated Ad Server cookie 124. As explained earlier, when Ad 123 is downloaded within the frame of the browser, this cookie is planted—i.e., placed in a lookup table accessible to the browser 110. When a user selects Ad 123 during a clickthrough operation performed by the user, browser 110 supplies both an Ad URL and a cookie (describing the user's prior profile created by Ad Server 160) to Ad Server 160. At this point Ad Server may perform any number of operations including: (1) measuring the click-through; (2) logging the site from which the click-through was referred (host 150); (3) correlating the cookie with the particular ad 123 selected; (4) re-directing the user's browser 110 to an Ad site 190, where the user can access additional content directly from an vendor/service provider. These are but some of the conventional operations currently performed by third party Ad Servers 160, and is not intended to be an exhaustive list. The key point is that the use of cookies 124 permits Ad Server 160 to identify and correlate the user's activities in a manner not possible without such files.

Thus, the situation with an ad 135 downloaded within applet 132 is dramatically different. Because of cookie restrictions, applet 132, having originated from host 150, is unable to plant a cookie 136 within browser 110. Furthermore, because of Java sandbox restrictions, applet 132 cannot read a cookie from a browser lookup table, even if one could be found for Ad Server 160. Thus, there is no current mechanism available for passing on a cookie 136 to an Ad Server 160 as part of a user clickthrough on Ad 135.

Figure 5A:
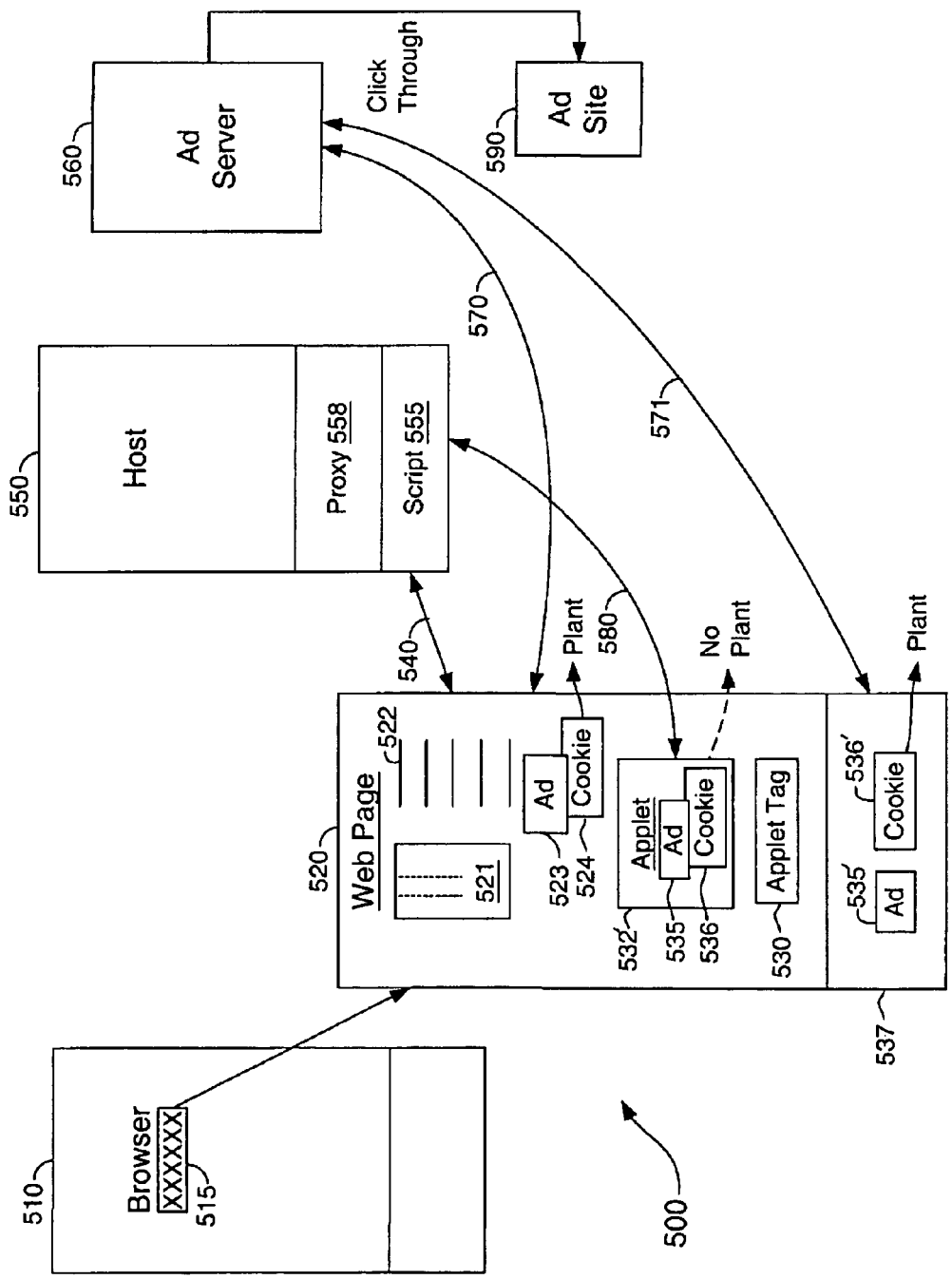
FIG. 5a is an illustration of a first embodiment of a second aspect of the present invention in which a client-server system operates over a network such as the Internet, and in which an applet running with a client browser is configured to properly handle clickthroughs on a third party Ad Server URL by controlling a second frame within the browser.

A first embodiment of a second aspect of the present invention remedies this limitation through the system illustrated in FIG. 5*a*. Again, except where specifically noted, the components of system 500 identified by the same numerical identifiers as those in system 100 are the same. The primary difference introduced by the Applicant is the use of proxy 558 running on host 550, and an improved applet 532', which communicate with each other to build an additional frame 537 readable by browser 510, and in which frame a substitute or proxy cookie 536' can be planted so as to be read by browser 110. Thus, in this embodiment, proxy 558 is also used for the benefits and advantages noted earlier.

Figure 6A:
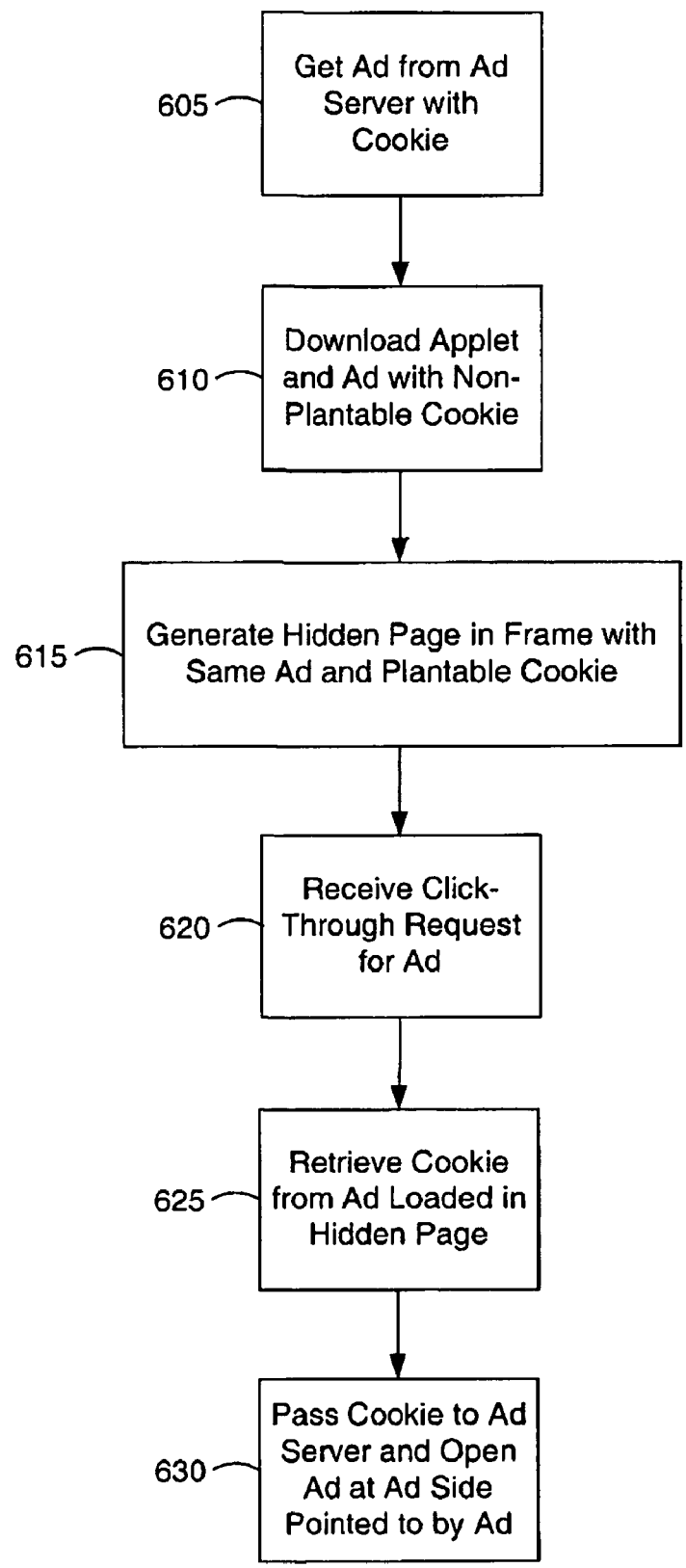
FIG. 6a is a flowchart depicting the material steps performed by a method of a first embodiment of the second aspect of the present invention shown in FIG. 5a to allow an applet to receive and process ad content from a wide variety of source materials.

The present scheme is best illustrated with reference to the flow diagram provided in FIG. 6*a*. When an ad 535 is obtained by proxy 558 at step 605, a cookie 536 associated with Ad Server 560 is also passed along as well. Ad 535 is downloaded to applet 532' at step 610, but cookie 536 is not planted at this time, since it would be of no practical use within the applet. Instead, at step 615, a cookie 536' for Ad Server 560 is cached by browser 510 at the same time that ad 535 is presented within applet 532. In particular, applet 532' is coded so that it controls a second, hidden frame 537 in page 520, which frame is originally coded as part of page 520. Each downloaded ad 535 is also "shown" in form 535' in this hidden frame 537 so that any cookies 536 from ad 535 are captured by browser 510 in the form of cookies 536'. Hidden frame 537 can be configured using conventional HTML coding so as to not be seen/perceived by the user, or to interfere with the user's perception of original page 520.

Accordingly, in the present implementation applet 532' knows about the extra frame from its associated "document" page, i.e., HTML page 520. To simplify control, page 520 is set up by default to have 2 frames—one frame with an applet 532', and the other frame with a name known by applet 532', for easy reference. Whether applet 532' needs to use the second frame is determined by the type of ad, or the type of function implemented by such applet. In this regard, proxy 558 can create, set and pass on a flag parameter to applet 532'—such as "Needscookies"—in accordance with its own evaluation of the ad presented from Ad Server 560. In the case of an ad requiring a cookie, proxy 558 sets needscookies=yes, and communicates this to applet 532'. At that point, applet 532' knows to put ad 535' in second frame 537. Thus, applet 532' uses the ad tag twice—once to download the image for display within the applet itself, and once to plant it within the hidden frame 537. This latter step is accomplished with a conventional javascript call from applet 532' to browser 510.

At step 620 when a click-through is requested by the user for Ad 635 within applet 532', browser 510 associates such request with a cookie 536' and retrieves it at step 625. At step 630 this substitute cookie 536', and an Ad URL for the ad, are passed on to Ad Server 560, where the final actual ad might be retrieved by a re-direction operation from ad server 560 from yet another ad site 590. In conventional operation, browser 510 maintains all cookies in a central, accessible location where the substitute cookie 536' is also stored. Therefore, from the perspective of Ad Server 560, and from the user's perspective, the invention works seamlessly to present an experience and functionality that is no different than the non-java based ad treatment described above.

It should be noted that in this preferred approach, cookies 536' are identical to cookies 536, and are completely usable by browser 510 in exactly the same way as it would normally do to pass on information during a click-through operation to Ad Server 560. It is apparent nonetheless that since ads can be passed through and filtered at proxy 558, additional information could be coded (if desired) and planted as part of cookie 536'. Moreover, while the present invention is described in the context of controlling a hidden frame within the browser for caching cookies, other frames might be generated and used for extending the reach of applets and proxies through the browser's functionality. For example, other applets in hidden frame 537 could be controlled by applet 532. Or, a web tour for the user could be implemented by clicking on the controlling applet to make a different website appear for viewing, by making the contents of hidden frame 537 become visible to the user.

Figure 5B:
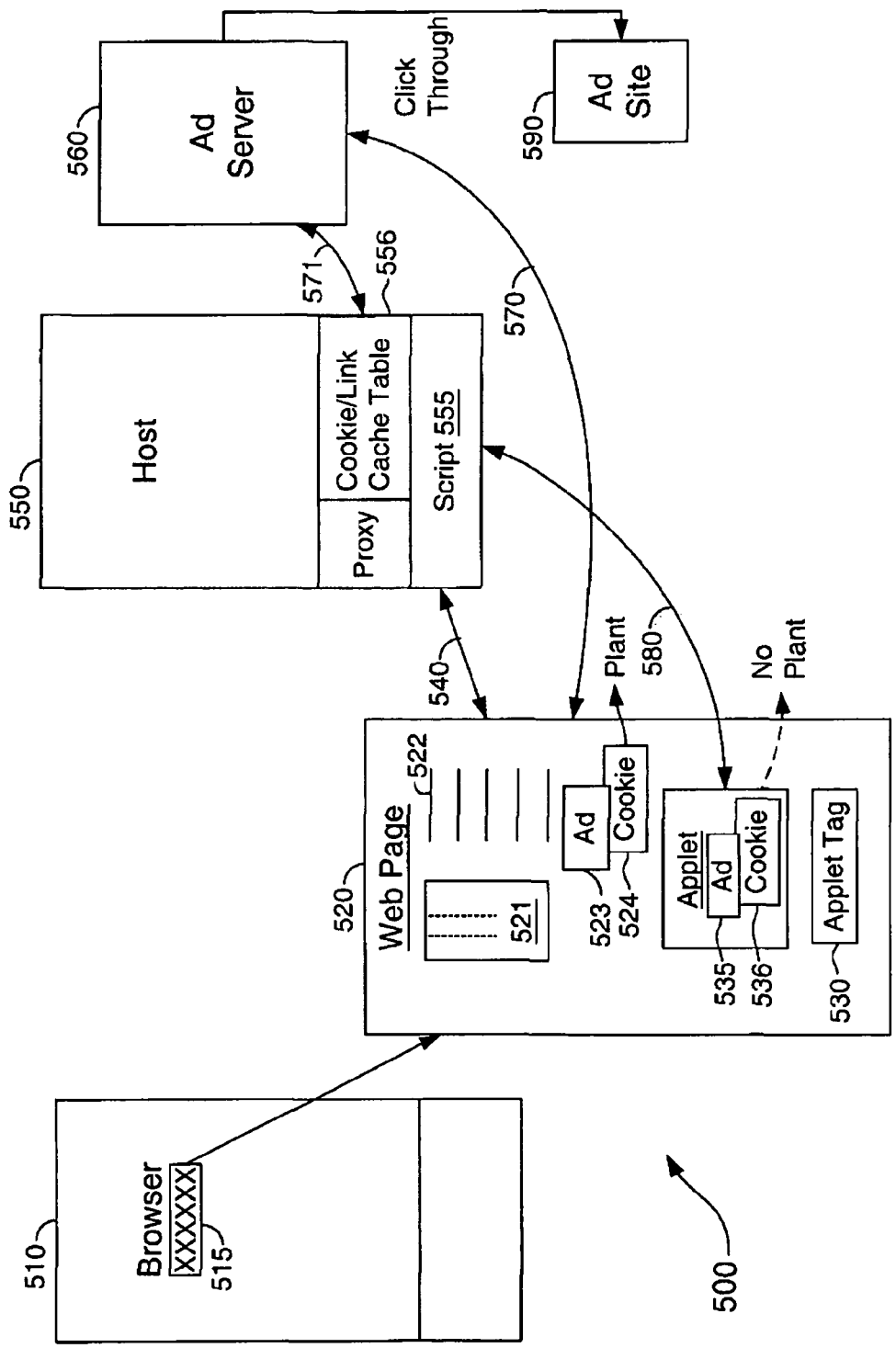
FIG. 5b is an illustration of a second embodiment of a second aspect of the present invention in which a client-server system operates over a network such as the Internet, and in which the server side proxy caches cookies for ads so that they can be used during clickthroughs.

A second embodiment of a second aspect of the present invention is illustrated in FIG. 5*b*. Again, except where specifically noted, the components identified by the same numerical identifiers in this embodiment are the same as those shown in the first embodiment discussed above. The primary difference introduced here is the fact that, in some cases, an ad server 560 will not provide sufficient detail for the planted cookie to be of any use in a subsequent click-through. This information varies from ad server to ad server, and thus, is not always predictable. Accordingly, it may be desirable or necessary to supplement the first embodiment above with the capabilities described now with respect to this second embodiment.

In this second embodiment, proxy 558 running on host 550 includes capabilities for directly caching cookies 536 in a cookie/link cache lookup table 556. During a normal ad retrieval operation, therefore, proxy 558 compiles a complete set of appropriate links and calls and stores them in table 556 to ensure that a later click-through of the ad presented within the applet can be satisfied by finding the exact banner match for such ad across link 571.

Figure 6B:
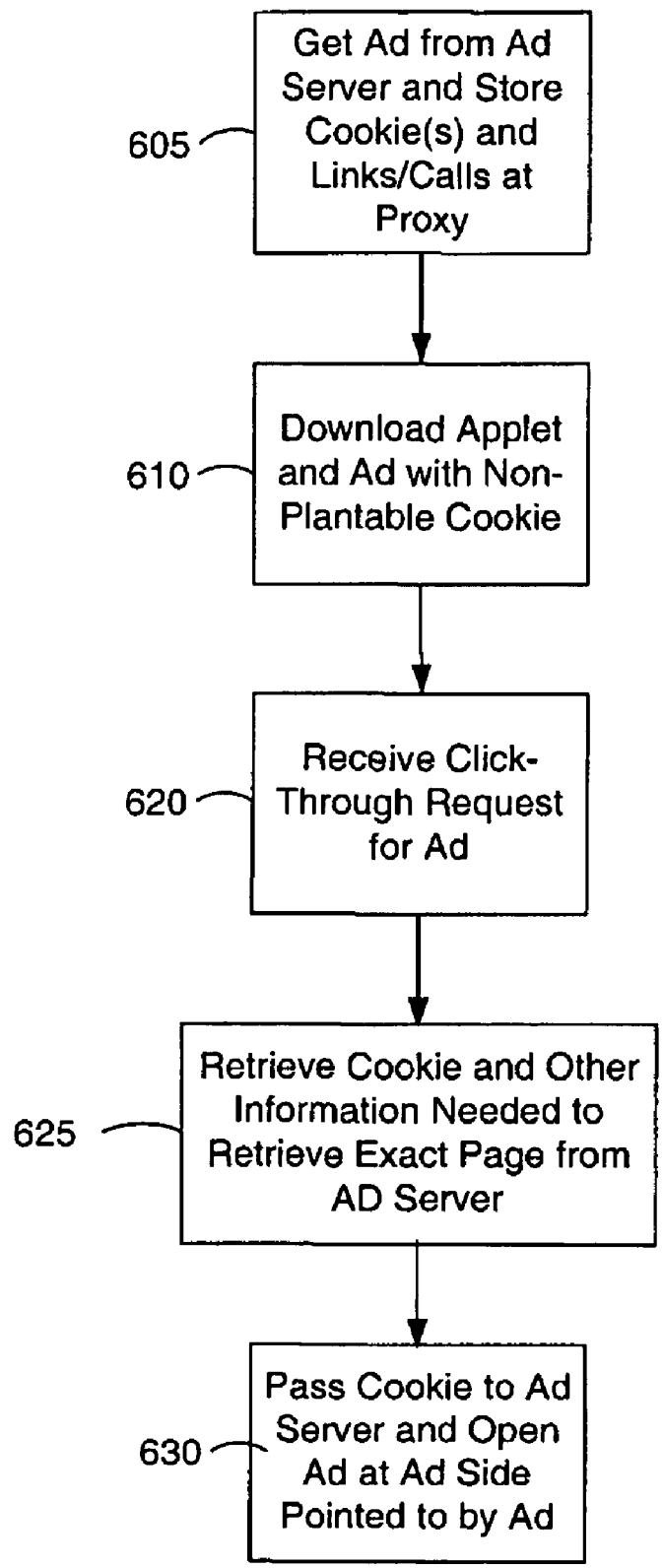
FIG. 6b is a flowchart depicting the material steps performed by a method of a second embodiment of the second aspect of the present invention shown in FIG. 5b.

This second embodiment is best illustrated with reference to the flow diagram provided in FIG. 6*b*. When an ad 535 is obtained by proxy 558 at step 605, a cookie 136 associated with Ad Server 560 is also cached as well in cookie/link table 556, which is indexed according to an ad number. As before, Ad 535 is downloaded to applet 532' at step 610, but cookie 536 is not planted at this time, since it would be of no practical use within the applet. At step 620 when a click-through is requested by the user for Ad 535 within applet 532', proxy 558 detects the request, and retrieves cookie 536' based on an ad number and retrieves it at step 325. At step 330 this substitute cookie 536' (and other pertinent link information) is used by proxy 558 in a series of operations to retrieve the corresponding ad from Ad Server 560. Thus, the intelligent proxy retrieves the relevant cookie and link information from a host side database 556, and uses the same to help the browser open the correct URL associated with the ad, which may be a page at Ad Server 560 or a third host site 590. From the perspective of the web user, proxy 558 acts to seamlessly duplicate this operation of a conventional browser, by storing ad cookies in a local cached database, except that a Java based ad is now supportable where it was not possible before.

Another aspect of proxy 558 is that host side database 556 can also be configured to store an IP address for a client, in order to glean useful demographics information for those ad servers that want to utilize the same. In other words, during a normal click-through, an ad server 560 identifies where browser 510 is located via an IP address supplied by the browser. This information is used to estimate and/or predict other demographics information about the user, such as his/her likely geographic location, sex, income, age, etc., and other details that can be correlated with such IP address. The IP address is provided as part of any normal HTTP call between host 550 and ad server 560 (it is part of the TCP/IP layer underneath the HTTP call) so normally the ad server would only see the proxy IP address for any applet based ad click-through as described above. To rectify this situation, the proxy can also store/cache (or independently generate) client IP address data, and thus add a client ID parameter along with the click-through URL so that (for those ad servers so adapted to see or listen to such client ID parameter info) such client demographics can be gleaned as would occur, again, in a normal HTML based ad click-through.

While the present invention is described in the context of caching cookie information for the browser, or client IP address information, other information might be generated and stored instead to emulate the capability of the user's browser.

Through the provision of these capabilities, the invention thus satisfies the needs of all the relevant entities involved in online advertising: (1) users, who are given the best type of application capability and the widest variety of advertising content; (2) destination sites (publishers) who can now better capitalize and quantify advertising impression activity by users for the benefit of advertisers; (3) advertisers, who are given an opportunity to spread content out on a more widespread basis to computing applications previously unavailable to them, and who are also now given an additional level of assurance that ad presentation statistics are more accurately measured; (4) advertising networks, who can now take advantage as well of the innovative ad delivery system to increase their connections to advertisers and destination sites.

It will be apparent to those in the art that proxy 558 is easily configured as a globally running process on host 550 so that it can be set up to handle a number of simultaneous requests from a number of distinct and uniquely running applets 532' distributed at any moment in time across the Internet. Furthermore, the collaboration and cooperation in computing functions, and distribution/allocations of tasks performed by proxy 558 and applet 532' can be specified on a connection by connection basis, so that, for example, some applets executing in high end client machines might receive a lot of assistance from proxy 558, while others would not require the same. The decision of how the task management of ad delivery is distributed across the network can be made on the basis of available computing resources at the client/server sides, available bandwidth, delays, etc., using any reasonable selection and optimization methodology implementable at host 550.

Finally, while Ad 535 is presented as a typical visual banner ad, it is possible that other types of multi-media information will be used by an applet, such as sound, video, etc. The invention is not limited to any particular implementation of ad content in this regard.

From a high level perspective, it can further seen that the present invention can be used to deliver ad content into a Java® applet that is executing on a typical desktop computer, laptop computer, a personal digital assistant (PDA), an enhanced cell phone, or any other system including a mechanism for executing Java® applets. The coordination and allocation of tasks between the applet and the proxy ensures smooth and accurate delivery of ad content to any number of platforms. The microcode and software routines executed here may be embodied in various forms of course, including in a permanent magnetic media, a non-volatile ROM, a CDROM, or any other suitable machine-readable format.

The above descriptions are intended as merely illustrative embodiments of the proposed inventions. It is understood that the protection afforded the present invention also comprehends and extends to embodiments different from those above, but which fall within the scope of the present claims.

The invention claimed is:

1. A method comprising:
providing a Java based software applet from a host of a destination site to a client site for execution within a web browser operating at the client site to view the destination site, the Java based software applet configured to include an interactive tag associated with content located at a third party site, wherein the content is not directly accessible to the Java based software applet;
caching cookie files associated with the content at the host using a proxy program, wherein the cookie files support click-through operation through a uniform resource locator (URL) associated with the content;
monitoring with the proxy program the click-through operation on the interactive tag to access the content; and
requesting the content using the proxy program, wherein the cookie files allow the content to be downloaded to the web browser for display at the client site under control of the proxy program.

2. The method of claim 1, wherein the Java based software applet is incorporated as part of a banner based on a web page associated with the destination site.

3. The method of claim 2, wherein the content includes advertising material associated with the banner.

4. The method of claim 1, wherein the proxy program is further configured to cache the content from the third party site such that the click-through operation can be satisfied by the destination site directly providing the content.

5. The method of claim 1, further comprising maintaining a file of links and calls at the host to support the click-through operations.

6. The method of claim 1, further comprising storing at the host IP address data associated with the click-through operation.

7. The method of claim 6, further comprising sending an ID parameter based on the IP address data to the third party site.

8. A method comprising:
supplying a Java based software applet from a host of a destination site for execution within a web browser operating at a client site to view the destination site, the Java based software applet including an interactive tag associated with content located at a third party site;
monitoring with a proxy program executed at the host click-through operation on the interactive tag to access the content;
requesting the content using the proxy program;
evaluating with the proxy program content display parameters associated with the content to determine if the content display parameters are compatible with applet display parameters associated with the Java based software applet.

9. The method of claim 8, wherein the Java based software applet is incorporated as part of a banner based on a web page associated with the destination site.

10. The method of claim 9, wherein the content is advertising material associated with the banner.

11. The method of claim 8, wherein the content display parameters include at least one of:
a type of content file to be displayed within the Java based software applet as part of the content;
a size of the content file; and
a refresh frequency to be used for the content file.

12. The method of claim 8, wherein when the content display parameters associated with the content are not compatible with applet display parameters, executing at the host at least one of:
modifying the content by the proxy program to make the content compatible with the Java based software applet, and
retrieving additional content from the third party site, and checking whether content display parameters of the additional content are compatible with the applet display parameters.

13. The method of claim 8, further comprising requesting and receiving ad content automatically as a result of at least one of a timer expiring and in response to receipt of a signal from the client site.

14. The method of claim 8, further comprising refreshing selected portions of the content as displayed at selected times.

15. The method of claim 8, further comprising caching the content from the third party site.

16. The method of claim 15, wherein the content includes advertising material supplied by an ad server.

17. The method of claim 16, further comprising soliciting and storing the content during a background task executed by the proxy program.

18. The method of claim 8, further comprising maintaining accounting and/or tracking information for use by the third party site to verify accesses to content that is cached.

19. The method of claim 8, further comprising:
determining whether the Java based software applet has been idle for a predetermined period; and
adjusting future content delivery to the Java based software applet based on the determination.

20. The method of claim 8, further comprising:
detecting when the third party site is unavailable; and
re-directing, based on the determination, the retrieval of content from another site.

21. A method comprising:
executing at a client site a Java based software applet originated from a destination site within a first frame of an Internet-capable browser presenting a destination site page;
displaying a first tag associated with a URL for a third party site in the first frame as a first visible tag;
controlling a second frame within the Internet-capable browser, the second frame being separate from the first frame and having a second tag for the third party site;
using the second tag to obtain the URL and a second cookie file related to a first cookie file from at least one of the destination site and the third party site; and
in response to click-through operation associated with the first visible tag, passing the URL and identification information in the second cookie file to the third party site permitting the click-through operation from within the Java based software applet to the third party site.

22. The method of claim 21, further comprising interacting with a proxy program from the destination site to construct and control the second frame.

23. The method of claim 22, further comprising using the second frame to plant the second cookie file within the Internet-capable browser when the third party site indicates to the proxy program that the second cookie file is needed to view an ad associated with the Java based software applet.

24. The method of claim 21, wherein the second cookie file includes information from the first cookie file and coded information associated with at least one of the destination site, the client site, and the Java based software applet.

25. The method of claim 21, further comprising making the second frame selectively viewable under control of the Java based software applet.

26. A machine-readable storage medium comprising instructions that when executed by a machine cause the machine to execute a operations comprising:
providing a Java based software applet from the machine of a destination site to a client site for execution within a web browser operating at the client site to view a web page, the Java based software applet including an interactive tag associated with content located at a third party site and not directly accessible to the Java based software applet;
caching cookie files associated with the content, wherein the cookie files support click-through operation through a uniform resource locator (URL) associated with the content;
monitoring with a proxy program the click-through operation on the interactive tag to access the content; and
requesting the content using the proxy program, wherein the cookie files allow the content to be downloaded to the web browser for display at the client site under control of the proxy program.

27. The machine-readable storage medium of claim 26, wherein the Java based software applet is incorporated as part of a banner based on the web page associated with the destination site.

28. The machine-readable storage medium of claim 27, wherein the content includes advertising material associated with the banner.

29. The machine-readable storage medium of claim 26, further comprising instructions that when executed by a machine cause the machine to execute operations comprising caching the content such that the click-through operation can be satisfied by the destination site directly providing the content.

30. The machine-readable storage medium of claim 26, further comprising instructions that when executed by a machine cause the machine to execute operations comprising maintaining a file of links and calls to support the click-through operation.

31. The machine-readable storage medium of claim 26, further comprising instructions that when executed by a machine cause the machine to execute operations comprising storing IP address data associated with the click-through operation.

32. The machine-readable storage medium of claim 31, further comprising instructions that when executed by a machine cause the machine to execute operations comprising sending an ID parameter based on the IP address data to the third party site.

33. A machine-readable storage medium comprising instructions that when executed by a machine cause the machine to execute operations comprising:
a first server separate from a second server;
displaying a first tag in a first frame of a browser running on a client system, the first tag associated with content at the second server, the content being accessible through use of identification information in a first cookie file, wherein the first cookie file is not cached by the browser within the client system for accessing the content;
generating a second frame within the browser, the second frame being separate from the first frame, and having a second tag for the content;
using the second tag to obtain a uniform resource locator (URL) and a second cookie file related to the first cookie file; and in response to click-through operation associated with the first visible tag, using the URL and identification information in the second cookie file to access the content.

34. The machine-readable storage medium of claim 33, further comprising instructions that when executed by a machine cause the machine to execute operations comprising requesting and receiving new ad content automatically as a result of at least one of a timer expiring and in response to receipt of a signal from the client system.

35. The machine-readable storage medium of claim 33, further comprising instructions that when executed by a machine cause the machine to execute operations comprising refreshing selected portions of the content as displayed at selected times.

36. The machine-readable storage medium of claim 33, further comprising instructions that when executed by a machine cause the machine to execute operations comprising caching the content.

37. The machine-readable storage medium of claim 36, wherein the content includes advertising material supplied by an ad server.

38. The machine-readable storage medium of claim 36, further comprising instructions that when executed by a machine cause the machine to execute operations comprising maintaining at least one of accounting and tracking information for use by the second server to verify access to the content that is cached.

39. The machine-readable storage medium of claim 33, further comprising instructions that when executed by a machine cause the machine to execute operations comprising:
   determining whether the machine has been idle for a predetermined period; and
   adjusting future content delivery based on the determination.

40. The machine-readable storage medium of claim 33, further comprising instructions that when executed by a machine cause the machine to execute operations comprising interacting with a proxy program running on the first server to construct and control the second frame.

41. The machine-readable storage medium of claim 40, further comprising instructions that when executed by a machine cause the machine to execute operations comprising using the second frame to plant the second cookie file within the browser when the second server indicates to the proxy program that the first cookie file is needed to view the content.

42. The machine-readable storage medium of claim 33, wherein the second cookie file includes information from the first cookie file and coded information associated with at least one of the first server and the client system.

43. The machine-readable storage medium of claim 33, further comprising instructions that when executed by a machine cause the machine to execute operations comprising making the second frame selectively viewable.

44. An apparatus comprising:
   a host of a destination site configured to supply a Java based software applet to a client site for execution within a web browser operating at. the client site to view the destination site, the Java based software applet configured to include an interactive tag associated with content located at a third party site, and the content is not directly accessible to the Java based software applet;
   a storage device at the host configured to cache cookie files associated with the content using a proxy program, wherein
      the cookie files support click-through operation through a uniform resource locator (URL) associated with the content; and
   a computing device at the host configured to:
      monitor with the proxy program the click-through operation on the interactive tag to access the content, and
      request the content from the third party site using the proxy program, wherein
         the cookie files cached at the host allow the content to be downloaded to the web browser for display at the client site under control of the proxy program.

45. An apparatus comprising:
   means for providing a Java based software applet from a host of a destination site to a client site for execution within a web browser operating at the client site to view the destination site, the Java based software applet configured to include an interactive tag associated with content located at a third party site, wherein the content is not directly accessible to the Java based software applet;
   means for caching cookie files associated with the content at the host using a proxy program, wherein the cookie files support click-through operations through a uniform resource locator (URL) associated with the content;
   means for monitoring with the proxy program the click-through operation on the interactive tag to access the content; and
   means for requesting the content from the third party site using the proxy program, wherein the cookie files allow the content to be downloaded to the web browser for display at the client site under control of the proxy program.

46. An apparatus comprising:
   a host of a destination site configured to supply a Java based software applet for execution within a web browser operating at a client site to view the destination site, the Java based software applet including an interactive tag associated with content located at a third party site;
   a computing device at the host configured to:
      monitor with a proxy program click-through operation on the interactive tag to access the content;
      request the content from the third party site using the proxy program;
      evaluate with the proxy program content display parameters associated with the content to determine if the content display parameters are compatible with applet display parameters associated with the Java based software applet.

47. An apparatus comprising:
   means for supplying a Java based software applet from a host of a destination site for execution within a web browser operating at a client site to view the destination site, the Java based software applet including an interactive tag associated with content located at a third party site;
   means for monitoring with a proxy program executed at the host click-through operation on the interactive tag to access the content;
   means for requesting the content using the proxy program; and
   means for evaluating with the proxy program content display parameters associated with the content to determine if the content display parameters are compatible with applet display parameters associated with the Java based software applet.

* * * * *

UNITED STATES PATENT AND TRADEMARK OFFICE
CERTIFICATE OF CORRECTION

PATENT NO. : 8,108,881 B2  
APPLICATION NO. : 12/329534  
DATED : January 31, 2012  
INVENTOR(S) : Hamel Page 1 of 1

It is certified that error appears in the above-identified patent and that said Letters Patent is hereby corrected as shown below:

Title page, item (73), under "Assignee", in Column 1, Line 1, delete "Mqquis" and insert -- Maquis --.

Column 1, line 11, delete "entitled System" and insert -- titled "System --.

Column 18, line 6, in Claim 26, delete "execute a operations" and insert -- execute operations --.

Column 19, line 60, in Claim 44, delete "at. the" and insert -- at the --.

Column 20, line 23, in Claim 45, delete "operations" and insert -- operation --.

Signed and Sealed this
Tenth Day of July, 2012

David J. Kappos
*Director of the United States Patent and Trademark Office*